United States Patent
Hasegawa et al.

(10) Patent No.: US 7,419,144 B2
(45) Date of Patent: Sep. 2, 2008

(54) FLUID FILLED VIBRATION DAMPING DEVICE

(75) Inventors: Koichi Hasegawa, Kasugai (JP); Noriaki Yoshii, Nagoya (JP)

(73) Assignee: Tokai Rubber Industries, Ltd., Komaki (JP)

( * ) Notice: Subject to any disclaimer, the term of this patent is extended or adjusted under 35 U.S.C. 154(b) by 253 days.

(21) Appl. No.: 11/236,762

(22) Filed: Sep. 28, 2005

(65) Prior Publication Data

US 2006/0066016 A1    Mar. 30, 2006

(30) Foreign Application Priority Data

Sep. 30, 2004    (JP)    ............... 2004-286205

(51) Int. Cl.
*F16F 13/10*    (2006.01)
(52) U.S. Cl. .................................. 267/140.13; 267/219
(58) Field of Classification Search ............ 267/140.13, 267/140.14, 140.15, 219
See application file for complete search history.

(56) References Cited

U.S. PATENT DOCUMENTS

| | | | | |
|---|---|---|---|---|
| 4,647,023 A | * | 3/1987 | Ray et al. | 267/140.13 |
| 4,738,435 A | * | 4/1988 | Flower et al. | 267/140.13 |
| 4,742,999 A | * | 5/1988 | Flower | 267/140.13 |
| 4,773,634 A | | 9/1988 | Hamaekers | |
| 4,815,720 A | | 3/1989 | Vanessi | |
| 4,974,818 A | * | 12/1990 | Kato | 267/140.13 |
| 5,104,100 A | * | 4/1992 | Simuttis | 267/140.13 |
| 5,443,245 A | | 8/1995 | Bellamy et al. | |
| 6,485,005 B1 | * | 11/2002 | Tewani et al. | 267/140.13 |
| 6,637,734 B2 | * | 10/2003 | Thomazeau et al. | 267/140.13 |
| 2003/0168789 A1 | * | 9/2003 | Kries et al. | 267/140.13 |

FOREIGN PATENT DOCUMENTS

| | | |
|---|---|---|
| FR | 2 674 590 A1 | 10/1992 |
| GB | 2 341 908 A | 3/2000 |
| JP | 62-147139 A | 7/1987 |
| JP | 5-34535 B2 | 2/1989 |
| JP | 4-33478 Y2 | 8/1992 |
| JP | 5-34535 B2 | 5/1993 |
| JP | 2569561 Y | 1/1998 |

\* cited by examiner

*Primary Examiner*—Thomas J Williams
(74) *Attorney, Agent, or Firm*—Oliff & Berridge, PLC

(57) ABSTRACT

A fluid filled vibration damping device wherein a first and second mounting member are connected by a main rubber elastic body, a pressure receiving chamber partially formed by the rubber elastic body and an equilibrium chamber partially formed by a flexible film are formed on either side of a partition member supported by the second mounting member, an orifice passage is formed for permitting a fluid communication between the pressure receiving chamber and equilibrium chamber communicate both having a non-compressible fluid; and a movable rubber plate is housed in a housing space so that minute pressure fluctuations in the pressure receiving chamber can be absorbed by the equilibrium chamber by means of the movable rubber plate. The movable rubber plate includes at least partially a corrugated part expanding generally a form of a corrugated panel by means of continuous depressions and protrusions.

12 Claims, 10 Drawing Sheets

FLUID FILLED VIBRATION DAMPING DEVICE

INCORPORATED BY REFERENCE

The disclosure of Japanese Patent Application No. 2004-286205 filed on Sep. 30, 2004 including the specification, drawings and abstract is incorporated herein by reference in its entirety.

BACKGROUND OF THE INVENTION

1. Field of the Invention

The present invention relates to a vibration damping device applicable as an engine mount for use in an automotive vehicle, for example, and in particular to a fluid filled vibration damping device in which damping effects are obtained based on flow action of a non-compressible fluid sealed in the interior.

2. Description of the Related Art

A fluid filled vibration damping is known as one type of damping connectors or damping supports mounted between members forming a vibration transmission system. JP-Y-4-33478 shows one example of the fluid filled vibration damping device. This type of damping device typically includes: a first and a second mounting member elastically connected together by a rubber elastic body; a pressure receiving chamber in which part of the wall is composed of the rubber elastic body; an equilibrium chamber in which part of the wall is composed of a readily deformable flexible film; an non-compressible fluid being sealed in the pressure receiving chamber and equilibrium chamber. Damping effects are brought about based on the resonance action of the fluid flowing through the orifice passage that is formed so as to connect the pressure receiving chamber and equilibrium chamber to each other, as a result of the relative change in pressure between the pressure receiving and equilibrium chambers when vibrations are input between the first and second mounting members.

Damping effects based on the resonance action of the non-compressible fluid flowing through the orifice passage are readily brought about only in a specific pre-tuned range of frequencies. A hydraulic absorption mechanism based on a movable panel has been proposed in order to improve damping performance by avoiding the development of extremely high dynamic spring, particularly during the input of vibrations in frequency ranges higher than the tuned frequency range of the orifice passage. In this hydraulic absorption mechanism, a housing space is generally formed in the partition member dividing the pressure receiving chamber and equilibrium chamber, and a movable panel is micro-displaceably disposed in the housing space. The housing space is formed via through holes in the pressure receiving chamber and equilibrium chamber, so that the pressure in the pressure receiving chamber is exerted on one side of the moveable panel, and the pressure in the equilibrium chamber is exerted on the other side.

The displacement of the movable panel due to differences in pressure between the pressure receiving chamber and the equilibrium chamber allows minute fluctuations in pressure in the pressure receiving chamber to escape into the equilibrium chamber during the input of high frequency vibrations. Because of the substantial vibration amplitude during the input of low frequency vibrations for which the orifice passage has been tuned, the movable panel comes into contact with and overlaps the inner surface of the housing space, effectively closing off the through holes. This prevents the absorption of pressure in the pressure receiving chamber by the hydraulic absorption mechanism, resulting in the effective production of relative pressure fluctuations between the pressure receiving chamber and equilibrium chamber, while also ensuring a sufficient flow of fluid through the orifice passage between the two chambers to bring about damping effects by the orifice passage.

However, during rapid pressure fluctuations in the pressure receiving chamber upon the input of vibrations of greater amplitude in this type of hydraulic absorption mechanism, the movable panel strikes the inner surface of the housing space. The impact of the movable panel striking the surface tends to result in noise and vibration. If used as an automobile engine mount, for example, the noise will sound disagreeable to the operator when the engine is cranked or while driving over bumps, detracting from the driving experience.

To address such problems, JP-Y-4-33478 proposed constructing a movable pane with a rubber elastic panel, and integrally forming a small protrusion in the form of a lip on the surface, so that the protrusion could absorb impact when struck. Although this type of small protrusion is effective against low energy strikes, it is not very effective during rapid and extensive pressure fluctuations in the pressure receiving chamber, and another way of dealing with this problem is needed.

SUMMARY OF THE INVENTION

It is therefore one object of this invention to provide a fluid filled vibration damping device equipped with a hydraulic absorption mechanism, which alleviates impact when the inner surface of the housing space of the movable late forming the hydraulic absorption mechanism is struck, thereby being capable of rapidly reducing disagreeable noise and the like caused by such strikes.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

According to a first mode of the invention provides: a fluid filled vibration damping device comprising: a first mounting member; a second mounting member; a main rubber elastic body elastically connecting the first and second mounting members; a pressure receiving chamber whose wall is partially formed by the rubber elastic body to accommodate pressure fluctuations during vibration input; an equilibrium chamber whose wall is partially formed by a flexible film to accommodate changes in volume; the pressure receiving chamber and the equilibrium chamber being disposed on either side of a partition member supported by the second mounting member, and having a non-compressible fluid sealed therein; an orifice passage through which the pressure receiving chamber and equilibrium chamber communicate with each other; a movable panel housed in a housing space that is provided in the partition member and held in communication with the pressure receiving chamber and the equilibrium chamber via through holes formed through the partition member so that a pressure of the pressure receiving chamber is exerted onto one side of the movable panel and the pressure in the equilibrium chamber is exerted onto an other side of the movable panel, wherein minute pressure fluctuations in the pressure receiving chamber during vibration input can be escaped into and absorbed by the equilibrium chamber by means of the movable panel, wherein the movable panel is composed of a movable rubber plate formed by a rubber elastic body, and includes at least partially a corrugated part which expands in generally a form of a corrugated panel by means of continuous depressions and protrusions.

In a fluid filled vibration damping device constructed according to this mode, the movable rubber plate includes at least partially the corrugated part in which the movable rubber plate is itself in the form of the corrugated panel. Based on the difference in pressure between the pressure receiving chamber and equilibrium chamber acting on both sides during the input of vibrations of substantial amplitude, the corrugated part repeatedly strikes the inner surface of the housing space or is further forced from a pre-contact state for an even broader range of contact. That is, when the movable rubber plate strikes the inner surface of the housing space, it results in hydraulic force which acts on the surface of the corrugated part through the through holes to force the movable rubber plate toward the inner surface of the housing space as well as a force reaction received from the inner surface of the housing space. As a result, the entire corrugated part becomes elastically deformed, and the impact energy occurring during the contact described above is effectively absorbed based on the attenuating force or elasticity associated with the elastic deformation of the corrugated part.

The elastic deformation of the corrugated part thus absorbs impact energy far more effectively than the conventional lip-shaped small protrusion on the surface of movable panels. Problems such as noise caused by the movable rubber plate striking the inner surface of the housing space can thus be effectively minimized or eliminated even in cases where sudden fluctuations in pressure occur such as when the engine is cranked or while driving over bumps in automobile engine mount applications, for example, contributing to a more comfortable driving experience.

In this mode, part of the corrugated part (protrusions on both sides) may be in previous contact with the inner surface of the housing space, as described in a second mode below, or the entire part may be stroke displaceable while floating between opposing inner faces of the housing space, as described in a ninth and tenth mode below. The impact caused by the corrugated part in the former case occurs due to strikes at points of contact which expand as a result of vibration beyond the point of contact in the initial vibration-free state, and strikes at the point of contact in the initial state as a result of the elastic deformation of the corrugated part during vibration input. The impact caused by the contact of the corrugated part in the latter case occurs as a result of strikes in cases where the corrugated part comes into contact with the inner surface of the housing space whenever the amplitude of the input vibrations increases, limiting the displacement.

The size and configuration of the corrugated part used in this mode are not particularly limited, and a variety of modes can be employed as noted in the various ones described below, such as those with continuous corrugations in the circumferential direction, those with continuous corrugations in one direction, or those in which corrugations are formed by dividing the movable rubber plate over a plurality of areas. The configuration and pitch of the corrugated part, as well as the size of its depressions and protrusions, and the like can be suitably designed to ensure effective absorption of contact impact according to the thickness (plate thickness of the movable rubber plate) and material of the corrugated part, the magnitude of the hydraulic pressure that is exerted, and the like. A specific example of a suitable configuration for the corrugations in order to achieve effective absorption of impact would be curved corrugations without sine wave-shaped corners, rather than a linear saw-toothed configuration. Preferably, the corrugated part thickness T (when the corrugated part has a shock-absorbing lip-shaped protrusion, the thickness includes this lip-shaped protrusion) should be 2 mm to 15 mm. The movable rubber plate including the corrugated part does not have to be of a constant thickness in its entirety. To ensure a stable state of contact on the inner surface of the housing space and effective impact absorption performance, the pitch P of the corrugations should preferably be at least two corrugation cycles, and even more preferably the distance PL between adjacent protrusions or between adjacent depressions should be $10 \text{ mm} \leq PL \leq 50 \text{ mm}$, preferably. The corrugation depth D (distance in the thicknesswise direction between the tips of the protrusions and the bottoms of the depressions on the same surface) should be at least 0.1 mm, preferably, and more preferably $0.2 \text{ mm} \leq D \leq 1 \text{ mm}$.

A second mode of the invention provides a fluid filled vibration damping device according to the first mode, wherein a height of undulations in a thicknesswise direction of the movable rubber plate between the protrusions on one side and the protrusions on an other side of the corrugated part of the movable rubber plate is greater than a height distance between opposite inner surfaces in the housing space, and the movable rubber plate thickness at each location of the corrugated part is less than the height distance between opposite inner surfaces in the housing space, so that all the protrusions on both sides of the corrugated part are in contact with the inner surfaces of the housing space, and all the depressions on both sides of the corrugated part are apart from the inner surfaces of the housing space, forming a gap therebetween.

In the fluid filled vibration damping device of this mode, the corrugated part is incorporated while elastically positioned in the thicknesswise direction of the plate inside the housing space, and the points of contact on the inner surfaces of the housing space expand in the circumferential direction through the elastic deformation of the corrugated part as a whole due to the hydraulic action associated with vibration input. Along with that, pressure fluctuations in the pressure receiving chamber escape into the equilibrium chamber, affording hydraulic absorption performance. Since the protrusions of the corrugated part are already in contact with the inner surface of the housing space, impact is promptly controlled for more effective suppression of noise and vibration during contact associated with displacement of the corrugated part.

A third mode of the invention provides a fluid filled vibration damping device according to the first or second mode, wherein a positioning member is disposed for positioning the movable rubber plate relative to the partition member to locate the movable rubber plate in generally a center inside the housing space in a direction perpendicular to the thicknesswise direction.

In the fluid filled vibration damping device in this mode, the movable rubber plate can be prevented from becoming offset inside the housing space, thus making it possible to stabilize the flow of the fluid in the housing space to obtain more stable hydraulic absorption performance in the pressure receiving chamber along with the displacement (including displacement based on deformation) of the movable rubber plate. Particularly when the structure of the second mode is employed, because the movable rubber plate is incorporated while positioned as it is compressed to a certain extent in the thicknesswise direction of the panel inside the housing space, it is extremely difficult to correct the movable rubber plate if it becomes off set in the housing space. The use of the present mode is a reliable way to avoid the problem of movable rubber plate displacement in the housing space.

A fourth mode of the invention provides a fluid filled vibration damping device according to the third mode, wherein the positioning member comprises a positioning engagement portion formed on a generally center on at least one side of the movable rubber plate in order to position the movable rubber plate relative to the partition member.

In the fluid filled vibration damping device of this mode, the positioning engagement portion is formed in generally the center, allowing the movable rubber plate to be readily attached, without the need for circumferential positioning relative to the partition member. The positioning engagement portion is also used to attach the movable rubber plate by simply superposing it on the partition member, making it even easier to attach the movable rubber plate on the partition member.

A fifth mode of the invention provides a fluid filled vibration damping device according to any one of the first through fourth modes, wherein the corrugated part has a shock absorbing lip protrusion integrally formed at a surface in contact with at lest one of the vertically opposite surfaces of the housing space.

In the fluid filled vibration damping device of this mode, the impact resulting when the movable rubber plate comes into contact with the partition member (inner surface of the housing space) is absorbed and attenuated not just by the deformation of the corrugated part as a whole, but also by the elastic deformation of the shock-absorbing lip protrusion. Since the shock-absorbing lip protrusion in particular is formed with soft spring properties relative to the entire corrugated part, it acts to complement the deformation of the corrugated part as a whole, allowing a broad range of impact to be even more effectively absorbed and attenuated, from the start of contact to the end, and furthermore from low to high frequencies. The shock-absorbing lip protrusion may, for example, extend linearly or distributed in the form of dots. A plurality of shock-absorbing lip protrusions of differing height may also be formed, or the height of a single linearly extending lip protrusion may be varied here and there.

A sixth mode of the invention provides a fluid filled vibration damping device according to any one of the first through fifth modes, wherein the movable rubber plate has at a central portion thereof a circular flat plate portion, and at a peripheral portion thereof an annular plate portion that is corrugated in the circumferential direction along an entire circumference thereof to constitute the corrugated part.

The fluid filled vibration damping device of this mode comprises both the flat plate portion and the corrugated portion so that the flow of fluid in the orifice passage is secured as a result of the through holes being effectively constricted or blocked by the flat panel portion, while ensuring that the impact from the corrugated part coming into contact with the inner surface of the housing space is absorbed and alleviated. In this mode, the shock-absorbing lip protrusion should be integrally formed on both sides in the thicknesswise direction of the flat panel portion. In this way, as will be described in a seventh mode below, the flat panel portion is sandwiched between a pair of facing inner surfaces in the housing space, with the shock-absorbing lip protrusion elastically deformed to a certain extent. The flat panel portion is displaced substantially in the thicknesswise direction of the panel in the housing space by the elastic deformation of the shock-absorbing lip protrusion, so as to effectively control noise and vibrations produced when the flap panel portion strikes the inner surface of the housing space. Alternatively, a gap is formed between the pair of facing inner surfaces in the housing space and the shock-absorbing lip protrusion on both sides of the movable rubber plate, so that even though the flat plate portion is freely displaceable to a certain extent in the thicknesswise direction of the panel in the housing space, the impact caused by the flat panel portion coming into contact with the inner surface of the housing space is effectively absorbed and attenuated by the elastic deformation of the shock-absorbing lip protrusion.

Also in the fluid filled vibration damping device in this mode, the corrugated part is formed in the outer peripheral portion of the movable rubber plate, ensuring a beneficial balance between the elasticity and rigidity of the movable rubber plate as a whole. When the movable rubber plate is displaced in the thicknesswise direction of the panel by differences in the pressure action on both sides, the maximum rate of slip is readily reached at the outer peripheral edge, which is the free end, and the maximum energy involved in the strikes on the inner surface of the housing space is readily reached. The problematic energy involved in the strikes at the outer peripheral edge can be effectively attenuated by the elastic deformation of the corrugated part, and the corrugated part even more effectively reduces disagreeable noise and the like caused by such strikes.

A seventh mode of the invention provides a fluid filled vibration damping device according to any one of the first through sixth modes, wherein the movable rubber plate has at a central portion thereof a circular flat plate portion, and at a peripheral portion thereof an annular plate portion at a peripheral portion thereof that is corrugated in the circumferential direction along an entire circumference thereof to constitute the corrugated part, and wherein the flat plate portion and corrugated part both have integrally formed shock-absorbing lip protrusions on both sides in the thicknesswise direction of the movable rubber plate, which are in contact in a precompressed state with the inner surface of the housing space.

In the fluid filled vibration damping device in this mode, the impact that occurs when the flat panel portion strikes the inner surface of the housing space is effectively suppressed as noted in the sixth mode, and the impact that occurs when the corrugated part strikes the inner surface of the housing space is also effectively suppressed as noted in the second mode. Also, since the corrugated part is formed on the outer peripheral edge of the rubber elastic panel, even though all of the flat plate portion formed in the center is substantially superposed on the inner surface of the housing space to limit its displacement, the radial cross section of the corrugated part has a cantilevered structure, where it is supported only at the inner peripheral edge joined to the flat panel portion, effectively permitting oscillating displacement in the corrugated part, whereby impact is absorbed during the input of vibrations with greater amplitude.

An eighth mode of the invention provides a fluid filled vibration damping device with a structure according to any one of the first through third modes, wherein the movable rubber plate has a corrugated part along substantially an entirety thereof.

Because the corrugated part can be formed along a sufficiently large area in the fluid filled vibration damping device of this mode, the corrugated part can even more effectively absorb impact caused by the contact of the movable rubber plate on the inner surface of the housing space.

A ninth mode of the invention provides a fluid filled vibration damping device according to any one of the first, third, fourth, fifth, sixth and eighth modes, wherein the movable rubber plate is micro-displaceably disposed in the housing space in the thicknesswise direction of the plate with a given amount of gap all a way around, and the corrugated part, on at least one side of the movable rubber plate, initially strikes the inner surface of the housing space when the movable rubber plate is displaced and strikes the inner surface of the housing space at the partition member.

In the fluid filled vibration damping device in this mode, the entire rubber elastic panel is displaceable in the thicknesswise direction of the panel while in a free, unrestrained state, with a gap between the facing inner surfaces of the housing space. Thus, during vibration input, the entire rubber elastic panel is displaceable while in a floating state in the housing space, resulting in even more effective absorption of pressure in the pressure receiving chamber.

It is also effective to construct the mode in such a way that, when the movable rubber plate is displaced into contact with the inner surface of the housing space at the partition member, the corrugated part first strikes the inner surface of the housing space on at least one side. Thus, even when the corrugated part is formed on part of the movable rubber plate, the corrugated part first comes into contact with the inner surface of the housing space, so that the impact produced by strikes is effectively absorbed by the elastic deformation action of the corrugated part in the early stages of the contact.

A tenth mode of the invention provides a fluid filled vibration damping device according to any one of the first, third, fourth, fifth, sixth, eighth and ninth modes, wherein a height of the undulations in the thicknesswise direction of the movable rubber plate between the protrusions on one side and the protrusions on the other side of the corrugated part of the movable rubber plate is less than the distance between vertically opposite inner surfaces in the housing space, so that the corrugated part of the movable rubber plate is displaceably housed, with a given amount of gap in the thicknesswise direction of the movable rubber plate, and the corrugated part is displaced in the thicknesswise direction of the movable rubber plate into contact with the inner surface of the space.

In the fluid filled vibration damping device of this mode, the entire corrugated part is displaceable in the thicknesswise direction of the panel while in a free, unrestricted state, with a gap between the opposite inner surfaces in the housing space. Thus, during vibration input, the entire corrugated part is displaceable while in a floating state in the housing space, resulting in even more effective absorption of pressure in the pressure receiving chamber.

An eleventh mode of the invention provides a fluid filled vibration damping device according to any one of the first through tenth modes, wherein the second mounting member is generally cylindrical, the first mounting member is disposed apart from the second mounting member, an opening at one end of the second mounting member is fluid-tightly sealed by the main rubber elastic body that elastically connects the first and second mounting members, an opening at the other end of the second mounting member is fluid-tightly sealed by the flexible film, the partition member fixedly supports the second mounting member, being disposed so as to expand perpendicularly to the axis of the second mounting member between the facing surfaces of the main unit elastic body and flexible film, so that the pressure receiving chamber and equilibrium chamber are formed on either side of the partition member, the housing space is formed so as to expand perpendicularly to the axis of the second mounting member inside the partition member, and the movable rubber plate is housed in the housing space so as to expand perpendicularly to the axis of the second mounting member.

The fluid filled vibration damping device in this mode allows the pressure receiving chamber and equilibrium chamber to be effectively formed on either side of the partition member forming the housing space for the movable rubber plate, resulting in a more compact fluid filled vibration damping device overall. This is particularly suitable for use as automobile engine mounts or the like.

As is evident from the description above, in the fluid filled vibration damping device of the invention, impact caused when the movable panel strikes the inner surface of the housing space during the input of vibrations of greater magnitude is absorbed and attenuated by the impact absorption action associated with the elastic deformability of the movable rubber plate itself based on the elastic deformation of the corrugated part provided on the movable rubber plate as a movable panel. Disagreeable noise and the like can thus be effectively prevented because impact energy is effectively attenuated even when strikes or the like on the inner surface of the housing space result in impact force that is too great to be absorbed by conventional lip-shaped protrusions such as disclosed in the aforementioned JP-Y-4-33478 as a result of vibration loads of extremely high energy.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
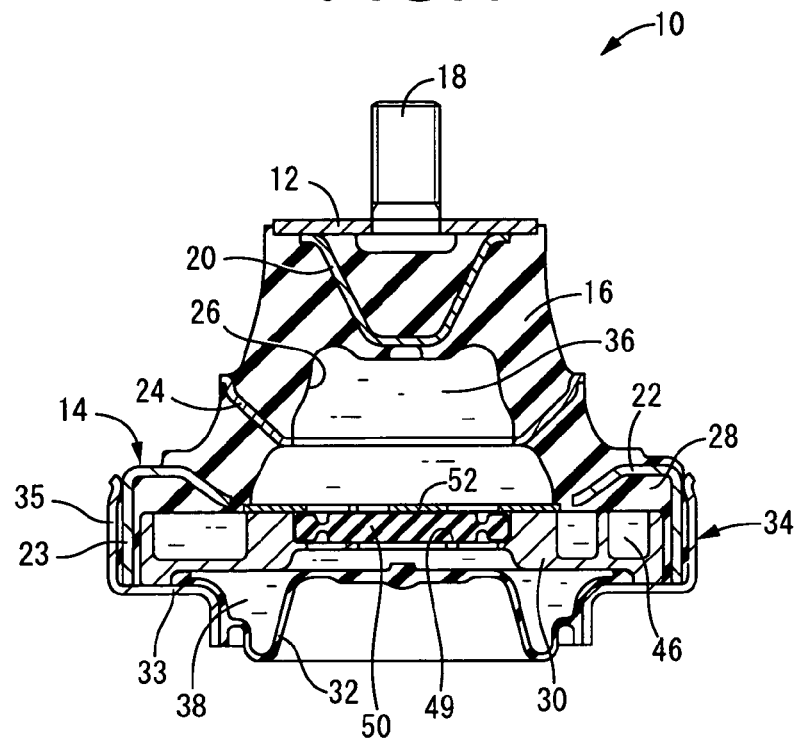
FIG. 1 is an elevational view in axial or vertical cross section of a fluid filled vibration damping device in the form of an engine mount of construction according to a first embodiment of the invention.
Figure 2:
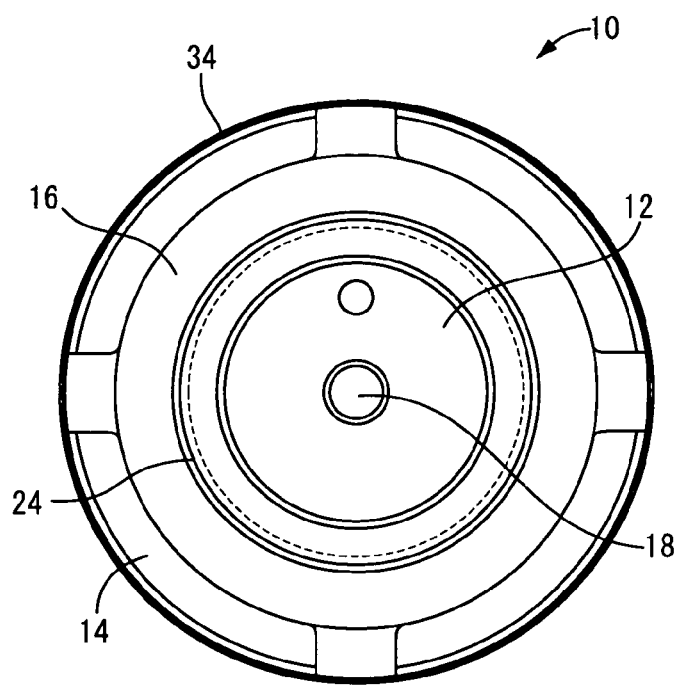
FIG. 2 is a top plane view of the engine mount of FIG. 1.

FIGS. 1 and 2 illustrate an automobile engine mount 10 in a first embodiment of the invention. This engine mount 10 has a construction wherein a metallic first mounting member 12 and a metallic second mounting member 14 are elastically connected by means of a main rubber elastic body 16. The engine mount 10 is such that the first mounting member 12 is attached to a power unit, while the second mounting member 14 is attached to a n automobile body, so that the power unit is supported in a vibration damping manner in cooperation with other engine mounts and the like (not shown) relative to the body. The first mounting member 12 and second mounting member 14 are vertically (in FIG. 1) displaced a certain distance toward each other as the main rubber elastic body 16 is elastically deformed by the input of the shared load of the power unit onto the mount 10 which has been set up in the manner described above, and the primary vibrations which are to be damped are input in generally the vertical direction in FIG. 1 between the first mounting member 12 and second mounting member 14. Mounted in this state, as illustrated in FIG. 1, the engine mount 10 in this embodiment is mounted with the central axis of the mount (central axis of the first and second mounting members 12 and 14) in the generally vertical direction, and the vertical direction in the following description will refer to the vertical direction in FIG. 1.

More specifically, the first mounting member 12 is generally disk shaped, with an upward (upward in FIG. 1) protruding attachment bolt 18 fixed in its center portion. A metallic retaining fixture 20 is fixed along the center axis to the bottom surface of the first mounting member 12. The retaining fixture 20 comprises a tapered peripheral wall gradually expanding toward the upper opening, and is fixed to the bottom surface of the first mounting member 12 at the peripheral opening.

The second mounting member 14 has a generally annular shape of large diameter, and is disposed along generally a concentric axis apart from and under (under in FIG. 1) the first mounting member 12. The structure of the second mounting member 14 is such that a fitting sleeve 23 protruding axially downward from the outer peripheral edge is integrally formed with a generally annular disk-shaped rubber fixing portion 22. The inner periphery of the rubber fixing portion 22 has a tapered slanting shape inclined gradually downward in the axial direction toward the center.

The main rubber elastic body 16 is disposed between the facing surfaces of the first mounting member 12 and second mounting member 14. The main rubber elastic body 16 has a generally conical shape of large diameter, with a large tapered round recess 26 in the center. The round recess 26 is a bottomed, inverted round hole that gradually expands radially downward and that is open at the large diameter end surface of the main rubber elastic body 16. The round recess 26 is formed so that the main rubber elastic body 16 has a thick-walled inverted cup shape overall.

The first mounting member 12 is superposed on a small diameter end surface in the upper axial direction of the main rubber elastic body 16, and the main rubber elastic body 16 is bonded by vulcanization to the first mounting member 12 and the retaining fixture 20 that is fused and fixed to the bottom surface of the first mounting member 12. The main rubber elastic body 16 is also packed into the retaining fixture 20. The rubber fixing portion 22 of the second mounting member 14 is also bonded by vulcanization, while generally embedded in a configuration inserted from the outer peripheral surface, in the large diameter end of the main rubber elastic body 16. In a word, the main rubber elastic body 16 is formed as an integrally vulcanized molded product comprising the first mounting member 12 and second mounting member 14.

A generally annular disk-shaped metallic reinforcing member 24 is fixed to the axial intermediate portion where the main rubber elastic body 16 is in the form of a thick-walled pipe, allowing the spring properties of the main rubber elastic body 16 to be adjusted. As illustrated in FIG. 1, the second mounting member 14 is covered by integrally forming a seal rubber layer 28 with the main rubber elastic body 16 so as to cover generally the entire inner peripheral surface of the fitting sleeve 23 and bottom surface of the rubber fixing portion 22.

A metallic partition member 30 as the dividing member and a diaphragm 32 as a flexible film are incorporated, from the opening in the lower axial direction of the second mounting member 14, with the integrally vulcanized molded article of main rubber elastic body 16 comprising the first and second mounting members 12 and 14.

The partition member 30 has a thick-walled generally disk shape. The diaphragm 32 is made of a readily deformable thin-walled rubber elastic film, and is bonded by vulcanization to a fitting fixture 34, the outer peripheral edge of which is generally annular disk-shaped. The partition member 30 and diaphragm 32 are thus fixed by being fitted to the second mounting member 14.

Specifically, the partition member 30 is fitted to the fitting sleeve 23 of the second mounting member 14, expanding in the axis-perpendicular direction. An outer peripheral surface and an upper surface of the outer peripheral surface of the partition member 30 is fluid-tightly placed on top of the fitting sleeve 23 and the rubber fixing portion 22 of the second mounting member 14, with the seal rubber layer 28 interposed between.

The diaphragm 32 is generally disk-shaped, with enough slack in the middle to be readily deformed. The diaphragm 32 is bonded by vulcanization at its outer peripheral edge to a metallic fitting fixture 34. The fitting fixture 34 has a structure wherein a cylindrical fixing pipe 35 protruding upward from the outer peripheral edge is integrally formed with an annular disk-shaped support 33. The outer peripheral edge of the diaphragm 32 is bonded by vulcanization to the inner peripheral edge of the support 33. The fixing pipe 35 is fitted to the fitting sleeve 23 of the second mounting member 14, and the diameter of the fixing pipe 35 is reduced by being constricted on all sides. The support 33 of the fitting fixture 34 is in contact with the bottom surface of the outer periphery of the partition member 30, and the fixing pipe 35 of fitting fixture 34 is fitted to the fitting sleeve 23. The surfaces where the fixing pipe 35 and fitting sleeve 23 are fitted together are fluid-tightly sealed with a seal rubber layer which has been formed as a coating on the fixing pipe 35.

In this way, the opening which opens downward through the center hole in the second mounting member 14 is fluid-tightly sealed by the diaphragm 32 at the round recess 26 formed in the main rubber elastic body 16. A non-compressible fluid is sealed in the area between the facing surfaces of the diaphragm 32 and main rubber elastic body 16, which has been formed by utilizing the round recess 26 and sealed off against external space, so that the area where the fluid is sealed is formed. Examples of sealed fluids which can be used include alkylene glycol, polyalkylene glycol, and silicone oil, but the use of low viscosity fluids no greater than 0.1 Pa·s is particularly preferred for more effective damping based on the resonance action of the fluid. The non-compressible fluid can be sealed, for example, by assembling the diaphragm 32 and partition member 30 with the integrally vulcanized and molded article of the main rubber elastic body 16, which comprises the first and second mounting members 12 and 14, in the non-compressible fluid.

The area in which the fluid is sealed is also divided into a top and bottom by providing the partition member 30 in the interior so as to expand in the axis-perpendicular direction. With this arrangement, part of the wall is formed by the main rubber elastic body 16 on one side of the partition member 30 (top in FIG. 1) in the axial direction, forming a pressure receiving chamber 36 in which fluctuations in pressure are caused by the elastic deformation of the main rubber elastic body 16 when vibrations are input between the first mounting member 12 and second mounting member 14. Part of the wall is formed by the diaphragm 32 on the other side of the partition member 30 in the axial direction, forming an equilibrium chamber 38 in which volume changes are readily accommodated by the elastic deformation of the diaphragm 32.

Figure 3:
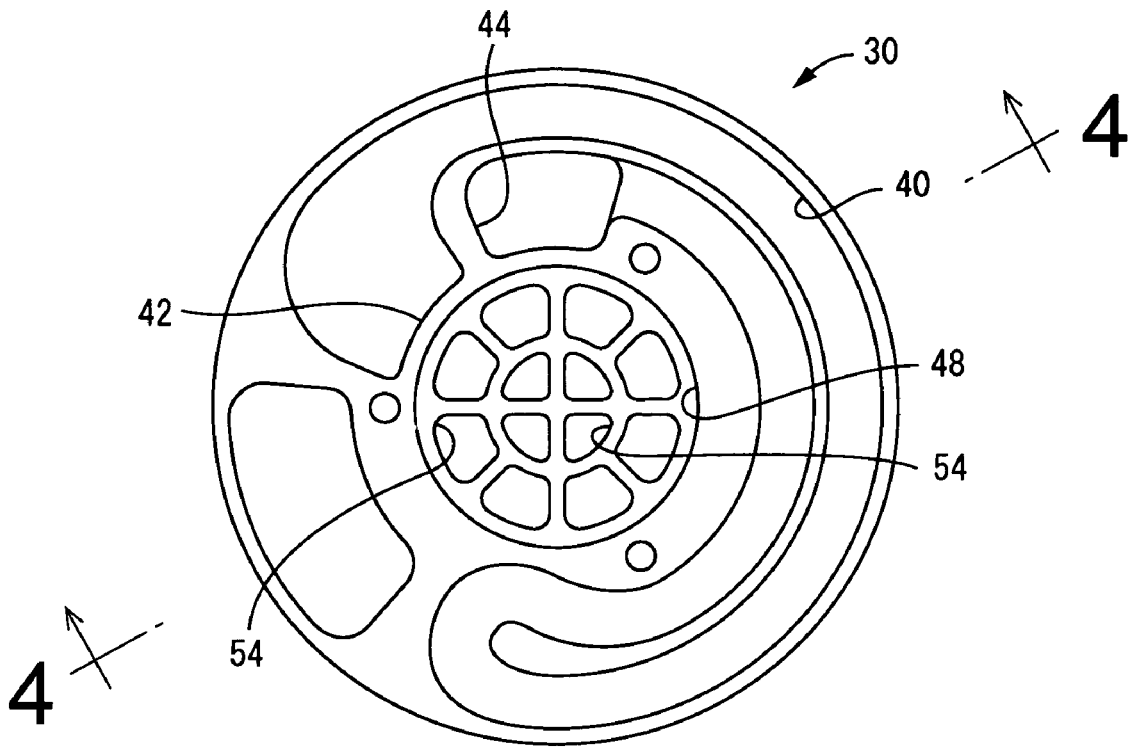
FIG. 3 is a top plane view of a partition member of the engine mount of FIG. 1.
Figure 4:
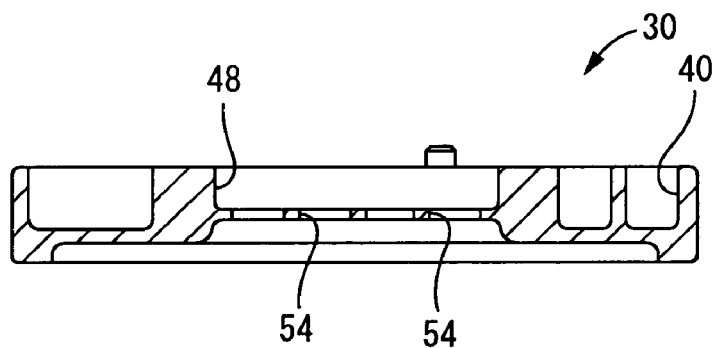
FIG. 4 is a cross sectional view taken along line 4-4 of FIG. 3.
Figure 5:
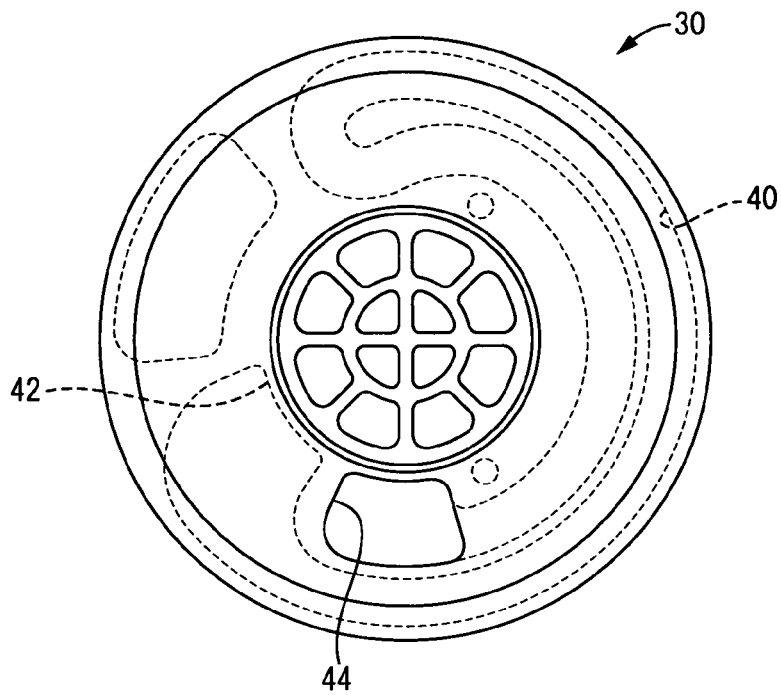
FIG. 5 is a bottom plane view of the partition member of FIG. 3.

As illustrated in FIGS. 3 through 5, a groove 40 that is open in the upper surface and extends continuously in the circumferential direction is formed in the outer circumferential surface, and the groove 40 is fluid-tightly sealed off by the rubber fixing portion 22 of the second mounting member 14, forming a tunnel-shaped conduit. In this embodiment, the groove 40 is formed reciprocally in the circumferential direction, traversing a portion around about ¾ of the upper circumference of the partition member 30. A weight-lightening recess is formed in a portion traversing about one fourth of the upper periphery where the groove 40 has not been formed, and is fluid-tightly sealed off by the rubber fixing portion 22 in the same manner as the groove 40.

One end of the groove 40 extends radially inward further than the inner periphery of the rubber fixing portion 22 of the second mounting member 14, so that the end of the groove 40 is open in the upper surface of the partition member 30 on the inner peripheral side past the rubber fixing portion 22, forming a through hole 42. One end of the groove 40 is connected through this through hole 42 to the pressure receiving chamber 36. The other end of the groove 40 opens through a through hole 44 formed in the floor of the groove 40 in the partition member 30, to open into and connect to the equilibrium chamber 38. The groove 40 in the partition member 30 is thus used to form an orifice passage 46, and the pressure receiving chamber 36 and equilibrium chamber 38 communicate with each other through this orifice passage 46.

Thus, during the input of vibrations, relative pressure fluctuations are produced between the equilibrium chamber 38 in which volume changes are accommodated by the deformation of the diaphragm 32, and the pressure receiving chamber 36, in which pressure fluctuations are produced, resulting in the flow of fluid through the orifice passage 46 between the two chambers 36 and 38. Axial vibrations (vertical direction in FIG. 1) which should be damped are thus effectively damped based on the resonance action of the fluid flowing through the orifice passage 46 between the pressure receiving chamber 36 and equilibrium chamber 38.

In this embodiment in particular, the resonance frequency of the fluid flowing through the orifice passage 46 is tuned so as to ensure effective damping of vibrations having greater amplitude and a lower frequency of about 10 Hz, such as shaking, based on the resonance action of the fluid. The resonance frequency is tuned by setting and adjusting the passage cross section area, length, and the like of the orifice passage 46, for example, while taking into consideration the wall spring synthesis or the like of the pressure receiving chamber and equilibrium chamber.

Figure 6:
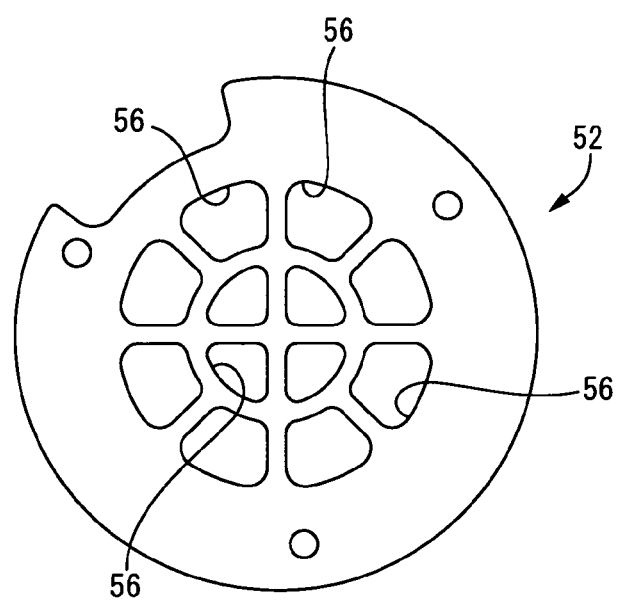
FIG. 6 is a top plane view of a rid metal member of the engine mount of FIG. 1.

A round center recess 48 open at the top is formed in the center of the partition member 30, and a movable rubber plate 50 is housed in the center recess 48. In this embodiment, the entire center recess 48 is generally a fixed depth. Also, a disk-shaped lid fixture 52 as illustrated in FIG. 6 is superposed onto the center of the partition member 30 by being aligned with three positioning protrusions on the partition member 30, and the positioning protrusions are crimped to fix the lid to the partition member 30 so as to cover the center recess 48. A hollow housing space 49 expanding in the form of a disk with a certain inside diameter and height is thus formed in the interior of the partition member 30. That is, the housing space 49 is formed between the axially facing surfaces of a pair of flat inner surfaces 53, 55 which both expand in the axis-perpendicular direction, and the distance L between the facing surfaces of the pair of inner surfaces 53 and 55 is greater by to a certain extent than the maximum panel thickness T (thickness of the panel, including shock-absorbing lip protrusions 64, 66, 68, 72, and 74) of the movable rubber plate 50 described below, as indicated by the imaginary lines in FIG. 8.

The movable rubber plate 50 is generally disk-shaped as a whole, and is integrally formed by rubber material. As noted above, the maximum panel thickness T of the movable rubber plate 50 is less than the height L of the housing space 49, resulting in the formation of a gap that expands along the entirety between the inner surfaces of the housing space 49 around the entire circumference of the movable rubber plate 50 while the movable rubber plate 50 is positioned in the center in the housing space 49. The movable rubber plate 50 is freely displaceable, while floating in the housing space 49, by a stroke corresponding to the size of the gap.

Through holes 54 and 56 are formed in the axial direction (vertical direction) in the floor of the center recess 48 of the partition member 30 forming the vertical wall of the groove 40, and in the lid fixture 52. The upper surface of the movable rubber plate 50 housed in the housing space 49 is exposed to the pressure receiving chamber 36 through the through hole 56 in the lid fixture 52, while the bottom surface of the movable rubber plate 50 is exposed to the equilibrium chamber 38 through the through hole 54 in the floor of the center recess 48. The through holes 54 and 56 are located along generally the entirety of the vertical opposite inner surfaces 53 and 55 of the housing space 49, and are open in particular in the facing areas of the central flat panel portion 60 described below, located in the center of the movable rubber plate 50, and the outer peripheral annular plate portion 62 described below, located in the outer peripheral portion.

The pressure in the pressure receiving chamber 36 and equilibrium chamber 38 are exerted on the upper surface and lower surface of the movable rubber plate 50, respectively, resulting in the displacement of the movable rubber plate 50 in the panel thicknesswise direction caused by differences in the pressure between the pressure receiving chamber 36 and equilibrium chamber 38 during the input of vibrations. The axial displacement of the movable rubber plate 50 results in the flow of fluid through the through holes 56 and 54 of the lid fixture 52 and partition member 30, so that the resonance action of the fluid or the hydraulic absorption action based on the escape of the pressure fluctuations in pressure receiving chamber 36 into the equilibrium chamber 38 results in low dynamic spring effects against input vibrations.

The vertical (thicknesswise direction of panel) stroke tolerance of the movable rubber plate 50 in the housing space 49 may be suitably adjusted on the basis of the amplitude of the input vibrations that should be damped, or the effective piston diameter and the size of the movable rubber plate 50, etc., in the pressure receiving chamber 36 of the engine mount 10. In this embodiment, the size of the gap between the facing surfaces of the upper and lower surfaces of the movable rubber plate 50 and the upper and lower surfaces of the housing space 49 is set so that the movable rubber plate 50 strikes the inner surface of the housing space 49 when vibrations with an amplitude of ±0.5 to 2.0 mm corresponding to engine shake act between the first mounting member 12 and second mounting member 14, but the movable rubber plate 50 is displaceable in areas where it does not strike the inner surface of the housing space 49 when vibrations of intermediate or low amplitude of no more than ±0.25 mm corresponding to the muffled sounds of driving or idling vibrations are input.

Figure 7:
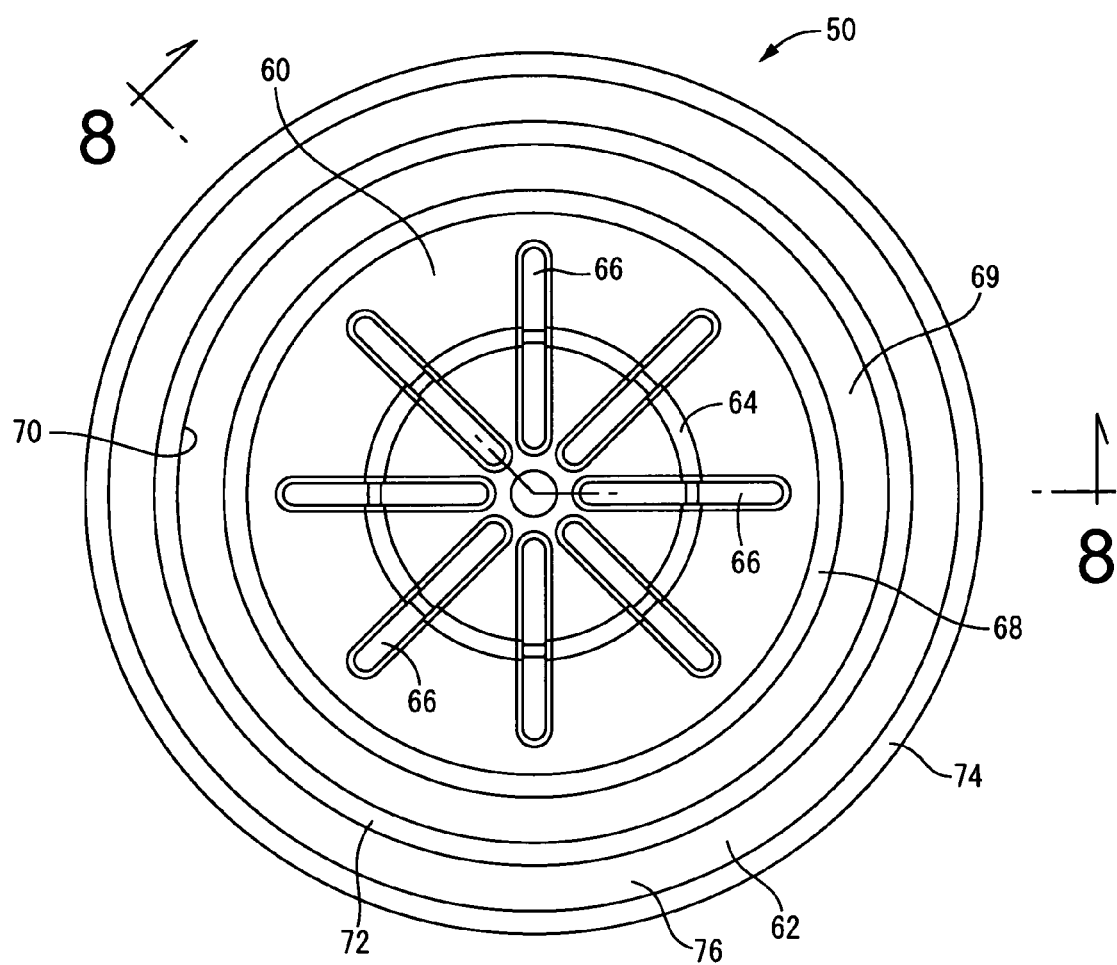
FIG. 7 is a top plane view of a movable rubber plate of the engine mount of FIG. 1.
Figure 8:
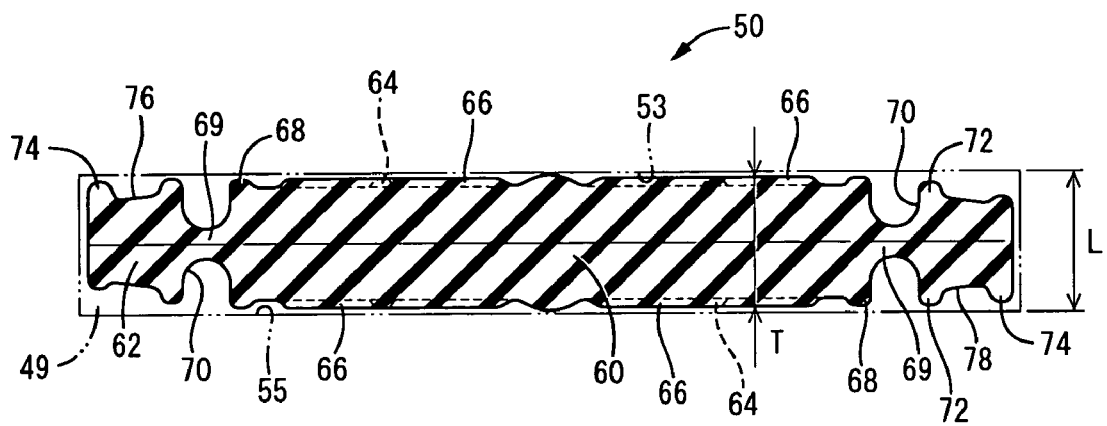
FIG. 8 is a cross sectional view taken along line 8-8 of FIG. 7.
Figure 9:
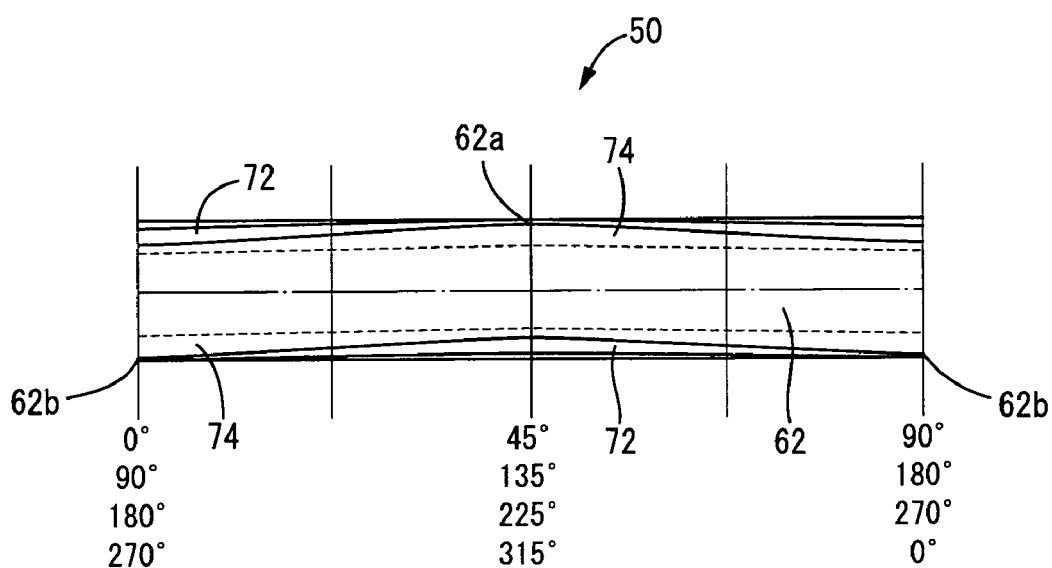
FIG. 9 is an exploded view of a quarter circumferential face of the movable rubber plate of FIG. 7.

As illustrated in FIGS. 7-9, the movable rubber plate 50 in this embodiment comprises the central flat panel portion 60 in the shape of a round flat panel as the flat panel portion, and the outer peripheral annular plate portion 62 in the form of an annular disk extending continuously in the circumferential direction at the outer peripheral edge.

The central flat panel portion 60 expands in a round shape at a generally constant thickness on the center axis, with several shock-absorbing lip protrusions integrally formed protruding on the upper and lower surfaces (on both sides in the thicknesswise direction). The shock-absorbing lip protrusions are composed of a) an annular first shock-absorbing lip protrusion 64 extending continuously in the circumferential direction through the radially intermediate portion, b) eight independent second shock-absorbing lip protrusions 66 extending radially outward from around the center axis, and c) an annular third shock-absorbing lip protrusion 68 extending continuously in the circumferential direction through the outer peripheral edge portion.

The outer peripheral annular plate portion 62 has an inside diameter greater than the outside diameter of the central flat panel portion 60, and is positioned along the same center axis as the central flat panel portion 60. In generally the center portion in the thicknesswise direction of the panel, the outer peripheral surface of the central flat panel portion 60 and the inner peripheral surface of the outer peripheral annular plate portion 62 are integrally joined together by facing radially extending thin-walled connectors 69. In other words, the upper and lower surfaces of the movable rubber plate 50 in this embodiment have a pair of excavated portions 70 and 70 continuously extending radially through portions which are a certain distance in the inward radial direction from the outer peripheral edge, and it is by means of these excavated portions 70 and 70 that the inner peripheral side serves as the central flat panel portion 60 and the outer peripheral side serves as the outer peripheral annular plate portion 62 on either side of the thin-walled connectors 69.

A fifth shock-absorbing lip protrusion 74 and an annular fourth shock-absorbing lip protrusion 72 continuously extending in the circumferential direction are formed in the inner peripheral edge and outer peripheral edge, respectively, on the upper and lower surfaces of the outer peripheral annular plate portion 62.

The thickness (including the upper and lower shock-absorbing lip protrusions) of the outer peripheral annular plate portion 62 is less than the thickness (including the upper and lower shock-absorbing lip protrusions) of the central flat panel portion 60. The outer peripheral annular plate portion 62 is in the form of a corrugated part which has been formed with a shape that curves and undulates as a whole so as to be corrugated in the panel thicknesswise direction (vertical direction in FIGS. 8 and 9) in the circumferential direction. That is, the outer peripheral annular plate portion 62 is altered in such a way that the center position in the thicknesswise direction oscillates vertically in the circumferential direction, with substantially no change in the radial cross section shape and size. In this embodiment in particular, as illustrated in FIG. 9, the vertical surface or center line of the outer peripheral annular plate portion 62 is corrugated in the circumferential direction in the general form of a sine wave in constant cycles, where the cycle is 90 degrees in the circumferential direction, and the vertical surface has a smooth curve as a whole.

In this embodiment, the outer peripheral annular plate portion 62 is progressively thinner toward the outer peripheral side, and the upper and lower surfaces 76 and 78 are radially inclined at generally the same angle. The connectors 69 are thin so that when the outer peripheral annular plate portion 62 is deformed and displaced into an oscillating shape pivoting on the connectors 69, contact is from the inner peripheral edge or the entirety makes contact at generally the same time, not just the outer peripheral edge. This permits displacement in the maximum possible oscillating angle range in the area until the outer peripheral annular plate portion 62 comes into contact with the inner surfaces 53 and 55 of the housing space 49.

Also in this embodiment, the inner peripheral edge on the lower surface 78 of the outer peripheral annular plate portion 62 is positioned on virtually the same flat plane as the bottom surface of the central flat panel portion 60 at a location which is the bottommost end (bottom dead center 62*b*) (the peripheral center portion of the downward facing convex part, on both the left and right ends in FIG. 9) of the outer peripheral annular plate portion 62. The inner peripheral edge on the upper surface 76 of the outer peripheral annular plate portion 62 is positioned on virtually the same flat plane as the upper surface of the central flat panel portion 60 at a location which is the uppermost end (top dead center 62*b*) (the peripheral center portion of the upward facing concave part, in the center location of FIG. 9) of the outer peripheral annular plate portion 62. Namely, in this embodiment, the height of undulations in the thicknesswise direction of the movable rubber plate 50 between the protrusion or the convex portion on one side (see 62*a* in FIG. 9) and the protrusion or convex portion on the other side (see 62*b* in FIG. 9) is smaller than the distance L between the vertically opposing inner surfaces 53, 55 of the housing space 49.

The first through third shock-absorbing lip protrusions 64, 66, and 68 in the central flat panel portion 60 and the fourth and fifth shock-absorbing lip protrusions 72 and 74 in the outer peripheral annular plate portion 62 are generally the same height.

Thus, in consideration of the fact that no elastic deformation is caused by external force in the movable rubber plate 50, the leading ends of the first through third shock-absorbing lip protrusions 64, 66, and 68 on the bottom surface of the central flat panel portion 60 and the leading end at the bottommost end (bottom dead center) (left and right end in FIG. 9) of the fourth shock-absorbing lip protrusion 72 in the lower surface 78 of the outer peripheral annular plate portion 62 are positioned on the same axis-perpendicular plane in the bottom surface of the movable rubber plate. On the upper surface, the leading ends of the first through third shock-absorbing lip protrusions 64, 66, and 68 on the upper surface of the central flat panel portion 60 and the leading end at the topmost end (top dead center) (center location in FIG. 9) of the fourth shock-absorbing lip protrusion 72 in the upper surface 76 of the outer peripheral annular plate portion 62 are positioned on the same axis-perpendicular plane.

Thus, where the movable rubber plate 50 is significantly displaced in the axial direction (vertical direction) in the housing space, they (the leading ends of the first through third shock-absorbing lip protrusions 64, 66, and 68, and the leading end in the specific position of the upper periphery of the fourth shock-absorbing lip protrusion 72) come into contact with the bottom and upper surfaces of the housing space at generally the same time.

In this embodiment, because the outer peripheral annular plate portion 62 becomes progressively thinner toward the outer peripheral side and the outer peripheral annular plate portion 62 is vertically curved in the circumferential direction, the fifth shock-absorbing lip protrusions 74 on the outer peripheral edge of the outer peripheral annular plate portion 62 virtually never come into contact with the inner surface of the housing space 49 at the parts of the outer peripheral annular plate portion 62 located on the upper surface at bottom dead center and on the lower surface at top dead center (that is, the peripheral center of the recess in the upper and lower surfaces). In this embodiment, the fifth shock-absorbing protrusions 74 and 74 are both shorter, with less weight and less rubber material, in the parts of the outer peripheral annular plate portion 62 located on the upper surface at bottom dead center and on the lower surface at top dead center.

The input of generally axial vibrations between the second mounting member 14 and first mounting member 12 while the engine mount 10 of this embodiment having the structure described above is mounted on an automobile will result in hydraulic absorption action based on the displacement of the movable rubber plate 50 in cases where the vibrations are idling vibrations of about ±0.1 to 0.25 mm or vibrations of intermediate or lower amplitude corresponding to muffled driving sounds of about ±0.01 to 0.05 mm. That is, during the input of vibrations of small amplitude in the medium to high frequency range, the movable rubber plate 50 will be vertically displaced in the movable range within the gap established between it and the housing space 49, and the fluid can thus flow between the pressure receiving chamber 36 and equilibrium chamber 38 through the through holes 56 and 54 by way of the housing space 49, so that pressure fluctuations in the pressure receiving chamber 36 escape into the equilibrium chamber 38. This prevents the development of extremely high dynamic spring caused by clogging as an anti-resonance phenomenon in the orifice passage 46, thus ensuring better damping performance.

On the other hand, in cases where the vibrations input between the first mounting member 12 and second mounting member 14 are of relatively greater amplitude in the lower frequency range, such as shaking during normal driving, which is about ±0.5 to 1.0 mm, or shaking when riding over bumps, which is about ±1.0 to 2.0 mm, the pressure fluctuations in the pressure receiving chamber 36 are less likely to be absorbed simply by the displacement of the movable rubber plate 50 within the displacement tolerance (movable range) in the housing space 49. That is, the upper and lower surfaces of the movable rubber plate 50 repeatedly come into contact with (strike) the upper and lower inner surfaces of the housing space 49. When the movable rubber plate 50 strikes the upper and lower inner surfaces of the housing space 49, the through holes 56 and 54 formed therein are constricted or substantially blocked by the movable rubber plate 50. The result is that relative pressure fluctuations are effectively produced between the pressure receiving chamber 36 and equilibrium chamber 38, and the fluid flows through the orifice passage 46 based on these relative pressure fluctuations. The desired damping effects are thus brought about based on the resonance action of the fluid flowing through the orifice passage 46.

When the movable rubber plate 50 comes into contact with the bottom inner surface of the housing space 49, in the outer peripheral annular plate portion 62, only the bottom surface at bottom dead center on the periphery curved so as to undulate in waves begins to come into contact in a total of four locations on the periphery. When the hydraulic pressure acting from the upper surface onto the movable rubber plate 50 then increases further, the outer peripheral annular plate portion 62 gradually becomes elastically deformed by the external force (pressure) which increases with the kinetic energy during contact, and the contact surface area gradually increases from the desired contact location on the bottom surface at bottom dead center on the periphery toward both sides in the circumferential direction.

When the outer peripheral annular plate portion 62 of the movable rubber plate 50 comes into contact with the upper inner surface of the housing space 49, the upper surface at top dead center on the periphery of the outer peripheral annular plate portion 62 begins to come into contact, and the contact surface area then increases as the contact surface gradually expands to both sides in the circumferential direction with increased in the elastic deformation of the outer peripheral annular plate portion 62. That is, the outer peripheral annular plate portion 62 strikes the inner surface 53 and 55 of the housing space 49 at parts other than the center of the convex portions on the upper and lower surfaces.

As a result of this state of contact, when the movable rubber plate 50 is in contact, the absorption action of the contact energy or the attenuation action associated with the elastic deformation of the outer peripheral annular plate portion 62 allows the impact to be effectively alleviated when the movable rubber plate 50 is in contact, thus suppressing impact or disagreeable noised caused by the contact between the movable rubber plate 50 and the inner surface of the housing space 49.

In this embodiment, disagreeable noises and impact can be absorbed even more effectively because the low impact occurring when the movable rubber plate 50 comes into contact with the inner surface of the housing space 49 can be absorbed by the elastic deformation of the first through fifth shock-absorbing lip protrusions 64, 66, 68, 72, and 74.

In particular, the small shock-absorbing lip protrusions as well as the elastic deformation of the movable rubber plate 50 of a desired thickness are utilized to absorb energy when the movable rubber plate 50 comes into contact with the inner surfaces of the housing space 49, allowing impact during substantial contact to be effectively absorbed or attenuated.

Also in this embodiment, because of the free displacement end in particular, the peak displacement rate occurs during strikes, and the corrugated part which absorbs impact during contact is formed in the outer peripheral edge (outer peripheral annular plate portion 62) of the movable rubber plate 50, allowing impact to be even more effectively absorbed by the corrugated part.

In this embodiment, thin connectors 69 are formed near the outer peripheral edge of the movable rubber plate 50, and the outer peripheral annular plate portion 62 is deformable and displaceable independently, to a certain extent, of the central flat panel portion 60, so that the displacement and elastic deformability in the outer peripheral annular plate portion 62 can be prevented from being overly restricted by the central flat panel portion 60, thereby ensuring the beneficial elastic displacement of the outer peripheral annular plate portion 62 during contact. This results in even more effective absorption of impact during the contact described above upon the elastic deformation of the outer peripheral annular plate portion 62.

Figure 10:
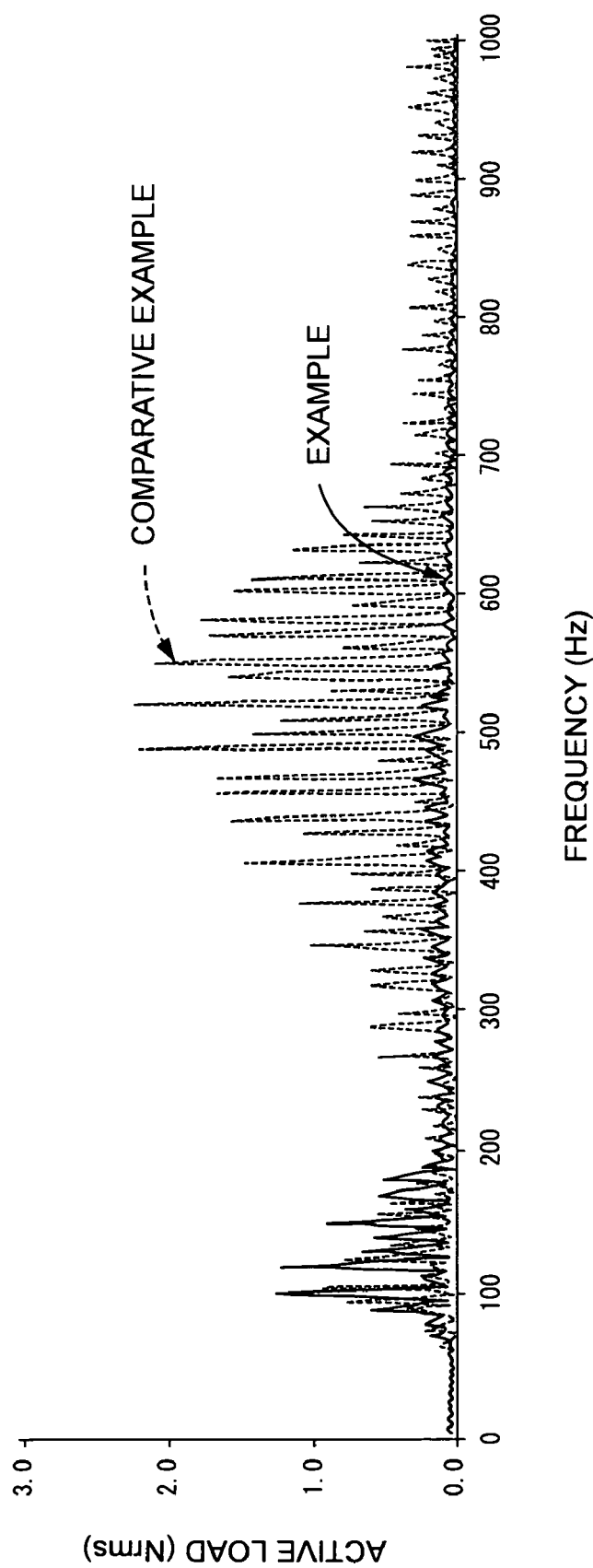
FIG. 10 is a graph demonstrating a result of frequency analysis of the output data of the active load sensed when the engine mount of FIG. 1 is subjected to vibration input.

Incidentally, FIG. 10 shows the results of damping performance measured in an automobile engine mount 10 having a structure according to the above embodiment. The basic data was obtained using an acceleration sensor to detect vibrations on the outputs side (second mounting member 14) when axial vibrations were exerted on the first mounting member 12 while the second mounting member 14 was fixedly supported during the above measurements. In this data, low frequency components were eliminated using a 100 Hz high pass filter, and the results of frequency analysis upon Fourier transformation of the resulting data are given in FIG. 10. Measurements were taken on vibration input (shaking) at a frequency of 10 Hz and vibration amplitude of 4 mm.

In the structure used as a comparative example, the central flat panel portion 60 and outer peripheral annular plate portion 62 were integrally joined by connectors 69 in the same manner as the movable rubber plate 50 of the above embodiment, but the outer peripheral annular plate portion 62 did not have a corrugated shape in the circumferential direction. In the engine mount that was prepared, all parts were the same as in the above embodiment except the structure of the movable rubber plate, where lines joined around the entire circumference in the cross sectional center of the outer peripheral annular plate portion 62 were positioned on one plane. The engine mount of the comparative example was tested in the same manner as the engine mount 10 of the embodiment above. The results for the comparative examples are also given in FIG. 10.

FIG. 10 shows that the value of the energy load (Nrms) corresponding to the magnitude of the vibrations or noise in the engine mount with the structure of the invention (embodiment) were effectively reduced in a broad range of high frequencies (200 Hz to 1000 Hz) which tend to be a particular problem. In contrast, the energy load was greater over all in the engine mount of the comparative example, with a substantial energy load at least 5 times greater than in the engine mount of the embodiment, particularly within a broad range of 300 to 700 Hz.

In the first embodiment described above, the panel thickness T of the central flat panel portion 60 and the distance in the panel thicknesswise direction (undulating height) between the convex portion on the upper surface 76 and the convex portion on the lower surface 78 of the outer peripheral annular plate portion 62 were about the same, so that when the movable rubber plate 50 is axially displaced into contact with the inner surfaces of the housing space 49, the central flat panel portion 60 and outer peripheral annular plate portion 62 come into contact at generally the same time, but the values can be set so that the central flat panel portion 60 and outer peripheral annular plate portion 62 come into contact in sequence, beginning on either side.

Figure 11:
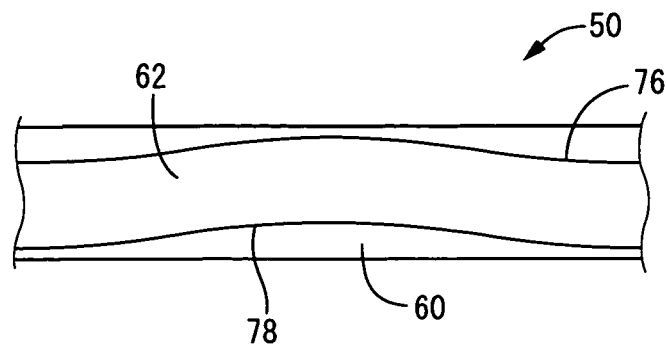
FIG. 11 is an exploded view corresponding to FIG. 9, illustrating a quarter circumferential face of a movable rubber plate of another construction.
Figure 12:
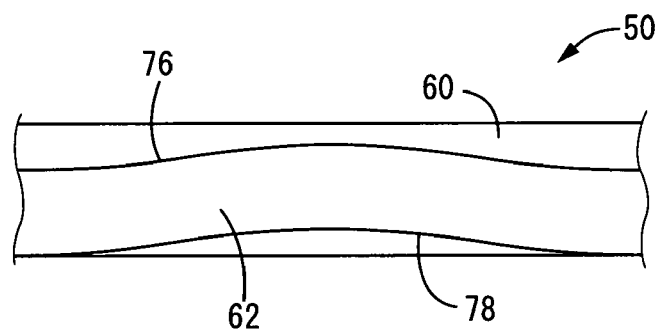
FIG. 12 is an exploded view corresponding to FIG. 9, illustrating a quarter circumferential face of a movable rubber plate of yet another construction.
Figure 13:
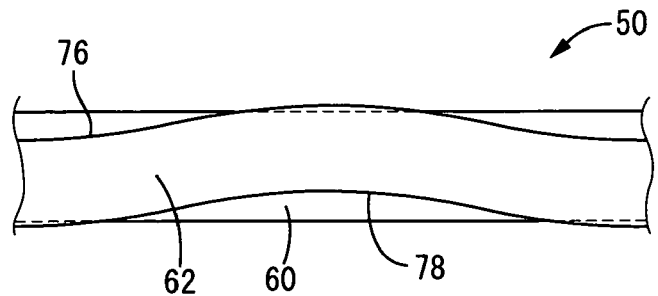
FIG. 13 is an exploded view corresponding to FIG. 9, illustrating a quarter circumferential face of a movable rubber plate of still another construction.

Specifically, the outer peripheral annular plate portion 62, which is the corrugated part, does not need to first come into contact with the inner surface of the housing space 49. As illustrated in FIG. 11, for example, top, and bottom dead center (points where the convex portions protrude the most upward and downward) on the upper and lower surfaces 76 and 78 may be positioned more inward in the panel thicknesswise direction than the upper and lower surfaces of the central flat panel portion 60, so that the outer peripheral annular plate portion 62 makes contact after the central flat panel portion 60 makes contact. With this structure, in cases where vibrations of at least substantial amplitude are input and the outer peripheral annular plate portion 62 forcefully strikes the inner surface of the housing space 49, the impact can be effectively absorbed by the elastic deformation associated with the strikes by the corrugated outer peripheral annular plate portion 62. FIGS. 11, 12, and 13 are side vies of models of the outer peripheral surface of the movable rubber plate viewed from the outward axis-perpendicular direction.

As illustrated in FIG. 12, an embodiment may be designed so that the outer peripheral annular plate portion 62, which is the corrugated part, comes into contact with the inner surface (lower or upper surface) of the housing space 49 at only the upper or lower surface of the movable rubber plate. This will allow impact to be effectively absorbed at the time of impact on at least one surface.

As illustrated in FIG. 13, top and bottom dead centers on the upper and lower surfaces 76 and 78 of the outer peripheral annular plate portion 62, which is the corrugated part, may protrude further outward in the panel thicknesswise direction than the upper and lower surfaces of the central flat panel portion 60. This will allow the outer peripheral annular plate portion 62 to come into contact with the inner surface of the housing space 49 before the central flat panel portion 60, and impact can be even more effectively absorbed by the elastic deformation of the outer peripheral annular plate portion 62.

In the first embodiment above, a gap was formed around the entire circumference of the movable rubber plate 50 while the movable rubber plate 50 was positioned in the center of the displacement tolerance in the housing space 49, but the movable rubber plate 50 may also be set up in the housing space 49 while already in a state of elastic contact or a state of further pressure in its panel thicknesswise direction. That is, even though the movable rubber plate 50 is set up in a state of pressure or a state of contact relative to the inner surfaces 53 and 55 of the housing space 49 in the panel thicknesswise direction, pressure differences act on the upper and lower surfaces of the movable rubber plate 50 the pressure in the pressure receiving chamber can be absorbed by the elastic deformation of the movable rubber plate 50. Furthermore, the movable rubber plate 50 is housed in such a state of pre-contact or pressure in the housing space 49, so that the impact of the movable rubber plate 50 striking the inner surface of the housing space 49 is even more effectively suppressed.

Figure 14:
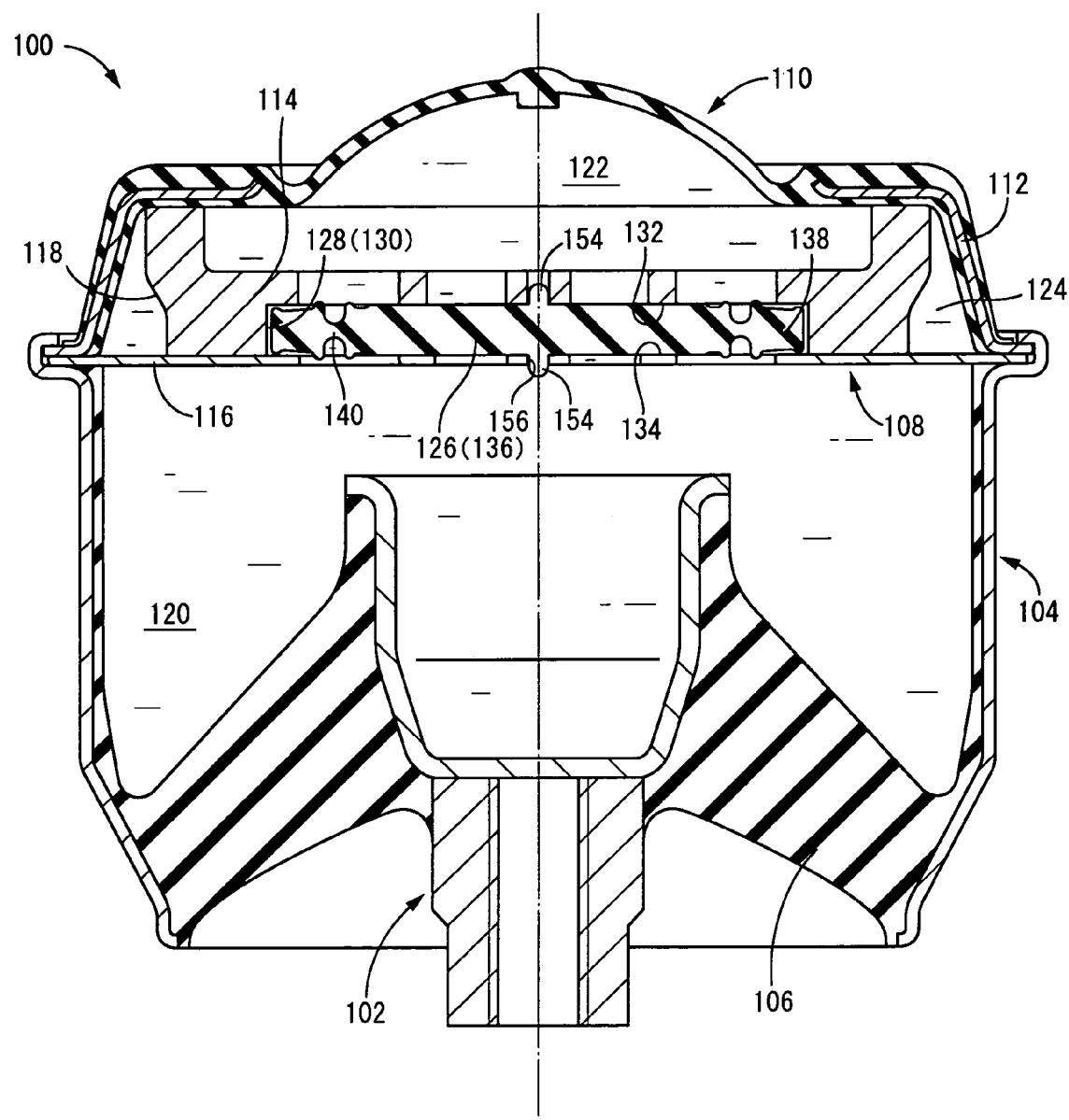
FIG. 14 is an elevational view in axial or vertical cross section of an engine mount of construction according to a second embodiment of the invention.

FIG. 14 illustrates a second embodiment of the invention in the form of an engine mount in which the movable rubber plate 50 is set up in the housing space 49 in a state or pressure in the panel thicknesswise direction. In the engine mount 100 illustrated in FIG. 14, a power unit attached to a first mounting member 102 is elastically supported in a suspended state by the vehicle body attached to a second mounting member 104, and is mounted with the vertical direction in FIG. 14 being in the generally vertical direction.

More specifically, in the engine mount 100 in this embodiment, the second mounting member 104 having a large diameter cylindrical shape is disposed at a distance on the outer peripheral side from the first mounting member 102. The first mounting member 102 is disposed on the same center axis in the bottom opening of the second mounting member 104, and the first mounting member 102 and second mounting member 104 are elastically linked by a main rubber elastic body 106. The main rubber elastic body 106 has a tapered generally thick cylindrical form open axially downward. The outer peripheral surface of the first mounting member 102 is bonded by vulcanization to the inner peripheral surface of the small diameter end, while the inner peripheral surface of the downward opening of the second mounting member 104 is bonded by vulcanization to the outer peripheral surface of the large diameter end.

That is, in this embodiment, an integrally vulcanized molded object is formed in which the first mounting member 102 and second mounting member 104 are bonded by vulcanization to the main rubber elastic body 106, and the axial downward opening of the second mounting member 104 is fluid-tightly covered by the main rubber elastic body 106.

A partition member 108 and a diaphragm 110 are attached to the upward opening of the second mounting member 104.

The diaphragm 110 is formed by means of a thin rubber elastic sheet so as to be readily elastically deformed with a certain amount of slack. An annular metallic fixing fixture 112 is bonded by vulcanization to the outer peripheral edge of the diaphragm 110. The fixing fixture 112 is crimped and fixed to the upper opening of the second mounting member 104, so that the upper opening of the second mounting member 104 is fluid-tightly sealed by the diaphragm 110.

A fluid chamber in which an non-compressible fluid is sealed is formed by being fluid-tightly shield from outside air between the axially facing surfaces of the main rubber elastic body 106 and diaphragm 110 on the inner periphery of the first mounting member 102. The fluid chamber is filled with the same non-compressible fluid as in the first embodiment.

The partition member 108 is formed by superposing a metallic lid fixture 116 in the form of a thin disk on the bottom surface of a metallic orifice fixture 114 which is in the form of a thin disk. The outer peripheral edge of the lid fixture 116 is superposed on the outer peripheral edge of the fixing fixture 112, and is crimped and fixed to the second mounting member 104 along with the fixing fixture 112. The outer peripheral edge of the orifice fixture 114 is fluid-tightly flanked by the lid fixture 116 and fixing fixture 112 and fixed to the second mounting member 104.

The partition member 108 comprising the orifice fixture 114 and lid fixture 116 is located in the intermediate portion between the axially facing surfaces of the main rubber elastic body 106 and diaphragm 110, where it is disposed while expanding in the axis-perpendicular direction. As a result, the fluid chamber is divided by the partition member 108 into upper and lower sides, forming a pressure receiving chamber 120 and equilibrium chamber 122. Part of the wall in the pressure receiving chamber 120 is formed by the main rubber elastic body 106, allowing pressure fluctuations to be produced during vibration input. Part of the wall in the equilibrium chamber 122 is formed by the diaphragm 110, allowing changes in volume to be readily accommodated.

The pressure receiving chamber 120 and equilibrium chamber 122 are joined together by an orifice passage 124 formed in the partition member 108. That is, a peripheral groove 118 formed on the outer peripheral surface of the orifice fixture 114 and extending a certain length in the circumferential direction is covered by the lid fixture 116 and fixing fixture 112, so that the orifice fixture 114, lid fixture 116, and fixing fixture 112 cooperatively form the orifice passage 124 extending a certain distance in the circumferential direction in the outer periphery of the partition member 108. Although not illustrated, one end of the orifice passage 124 is joined to the pressure receiving chamber 120 through a through hole formed in the lid fixture 116, and the other end is joined to the equilibrium chamber 122 through a through hole formed in the orifice fixture 114.

The orifice passage 124 is tuned so as to achieve high attenuation during the input of vibrations in the low frequency range corresponding to engine shake in the same manner as in the first embodiment.

A hydraulic absorption mechanism comprising a movable rubber plate 126 is formed in the center of the partition member 108. That is, a downwardly open housing recess 128 is formed in the center of the orifice fixture 114, and the downward opening of the housing recess 128 is covered by the lid fixture 116, forming a housing space 130. That is, the housing space 130 in this embodiment is formed with generally constant axially inward dimensions between the facing surfaces of a pair of facing inner surfaces 132 and 134 parallel to each other and expanding roundly in the axis-perpendicular direction, in the same manner as in the first embodiment.

Figure 15:
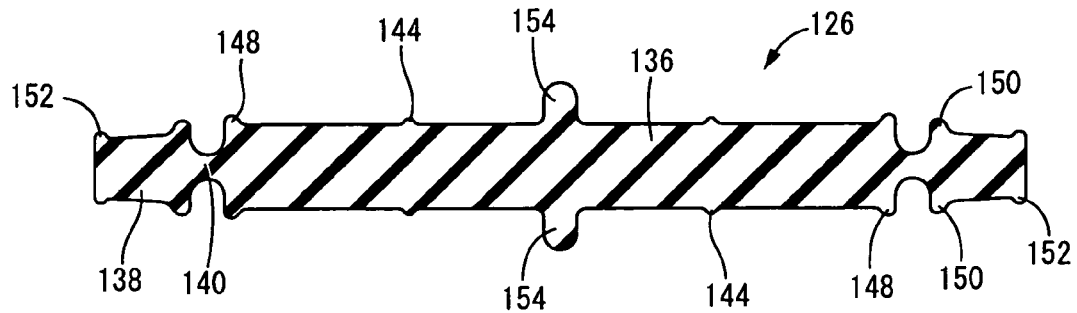
FIG. 15 is a vertical cross sectional view of a movable rubber plate of the engine mount of FIG. 14.
Figure 16:
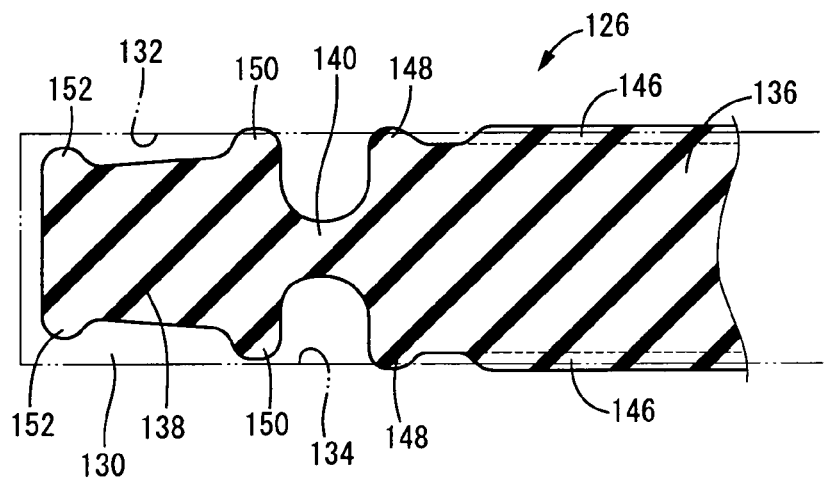
FIG. 16 is a fragmentary enlarged cross sectional view of a principle part of the movable rubber plate of FIG. 15.
Figure 17:
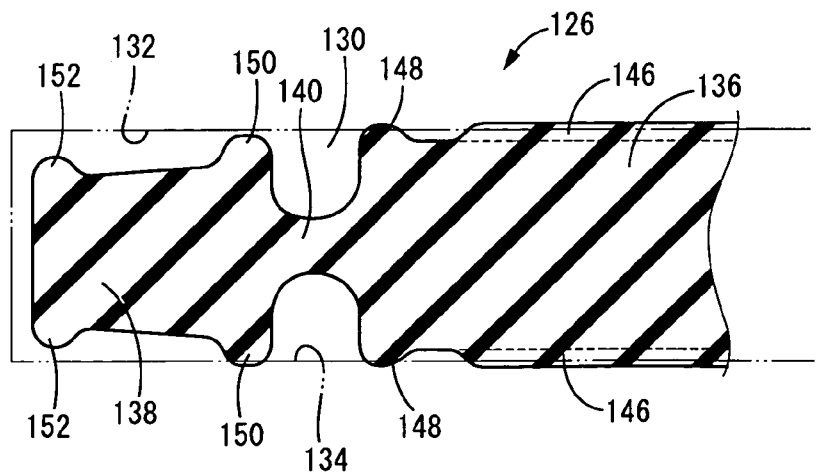
FIG. 17 is a fragmentary enlarged cross sectional view of a principle part of the movable rubber plate of FIG. 15.

The movable rubber plate 126 is housed in the housing space 130. As illustrated in FIGS. 15-17, the movable rubber plate 126 in this embodiment is integrally formed by means of a rubber elastic body with a structure in which a disk-shaped center flat panel portion 136 and annular disk-shaped outer peripheral annular plate portion 138 are linked by thin connectors 140. The movable rubber plate 126 in this embodiment is in the form of a vertically (axially) undulating corrugated part in which the center flat panel portion 136 is in the form of a flat panel and the outer peripheral annular plate portion 138 is continuous along its entirety in the circumferential direction, in the same manner as in the first embodiment. A plurality of peripherally or radially extending shock-absorbing lip protrusions 144, 146, 148, 150, and 152 which are the same as those in the first embodiment are integrally provided on the upper and lower surfaces of the center flat panel portion 136 and outer peripheral annular plate portion 138.

The movable rubber plate 126 in this embodiment differs in two ways from the one in the first embodiment. The first is thickness. The thickness T is greater (L<T) than the distance L (see FIGS. 16 and 17) between the facing inner surfaces 132 and 134 of the housing space 130 in the movable rubber plate 126.

In this way, the leading ends of the shock-absorbing protrusions 144, 146, and 148 formed on the upper and lower surfaces of the center flat panel portion 136 are in a state of contact with the facing inner surfaces 132 and 134 of the housing space 130, and are compressed to a certain extent in the axial direction.

In the outer peripheral annular plate portion 138, on the other hand, the height of the undulations in the panel thicknesswise direction between the protrusion or the convex portion on one side and the protrusion or the convex portion on the other side is greater than the distance between the vertically opposite inner surfaces 132 and 134 of the housing space 130. However, the panel thickness in various parts of the outer peripheral annular plate portion 138 is less than the distance between the facing inner surfaces 132 and 134 of the housing space 130.

In this way, the apex (part located uppermost, as illustrated in FIG. 16) of the upward facing convex portion in the upper surface of the outer peripheral annular plate portion 138 is in a state of contact with the inner surface 132 of the housing space 130, and the apex (part located lowermost, as illustrated in FIG. 17) of the downward facing convex portion in the lower surface is in a state of contact with the inner surface 134 of the housing space 130. However, on the upper surface of the outer peripheral annular plate portion 138, it is apart from the inner surface 132 of the housing space 130 in at least the central part (illustrated in FIG. 17) of the upward facing recess, resulting in a gap between 138 and 132. On the lower surface of the outer peripheral annular plate portion 138, it is apart from the inner surface 134 of the housing space 130 in at least the center of the downward facing recess (illustrated in FIG. 16), resulting in a gap between 138 and 134.

A pair of positioning members in the form of positioning protrusions 154 and 154 protruding vertically in the panel thicknesswise direction is formed in the movable rubber plate 126 on the center axis of the center flat panel portion 136. Positioning holes 156 and 156 are formed passing through in the panel thicknesswise direction on the center axis of the lid fixture 116 and orifice fixture 114 forming the upper and lower walls of the housing space 130. The inside diameter of the positioning holes 156 and 156 is the same as the outside diameter of the positioning protrusions 154 and 154 of the movable rubber plate 126.

The positioning protrusions 154 and 154 of the movable rubber plate 126 are fitted to the upper and lower positioning holes 156 and 156, so that the movable rubber plate 126 is positioned and supported in generally the axial-perpendicular center in the housing space 130. The positioning protrusions 154 and 154 may be fitted while freely inserted, with somewhat of a gap, in the positioning holes 156 and 156, and they may also be fitted without any gap. In the latter state, the displacement of the movable rubber plate 126 is constrained, but the displacement of the movable rubber plate 126 is permitted by the elastic deformation in areas other than the center. Positioning member for the movable rubber plate 126 is also constructed by a mechanism for fitting the positioning protrusions 154 and 154 into the positioning holes 156 and 156 in this embodiment. Namely, the positioning protrusions 154 and positioning holes 156 cooperate to provide a positioning engagement portion in this embodiment.

In the engine mount 100 having the structure described above, when differences in pressure between the pressure receiving chamber 120 and equilibrium chamber 122 caused by input vibrations acts on the movable rubber plate 126, substantially axial displacement is permitted in the housing space 130 based on the elastic deformation of the main parts or the upper and lower shock-absorbing lip protrusions 144, 146, and 148 in the center flat panel portion 136, allowing pressure to be absorbed in the pressure receiving chamber 120.

When differences in pressure between the pressure receiving chamber 120 and equilibrium chamber 122 act on the upper and lower surfaces of the outer peripheral annular plate portion 138, axial displacement based on elastic deformation is permitted in the housing space 130 not only because of the elastic deformation of the shock-absorbing lip protrusions 150 and 152, but also because, as noted above, in its entirety, one of the upper and lower surfaces at locations on the periphery comes into contact with one of the inner surfaces 132 and 134 of the housing space 130, and the other surface is positioned apart from the other of the inner surfaces 132 and 134 of the housing space 130. In particular, the displacement of the outer peripheral annular plate portion 138 is produced with relative ease by oscillating displacement pivoting on the connectors 140.

Thus, in this embodiment, because both the center flat panel portion 136 and outer peripheral annular plate portion 138 are in an initial state of contact on the upper and lower inner surfaces 132 and 134 of the housing space 130, this embodiment is more effective than the first embodiment in attenuating impact caused by the movable rubber plate 126 striking the inner surfaces 132 and 134 of the housing space 130 due to increases in the contact area as well as repeated contact and separation resulting from the elastic deformation of the movable rubber plate 126 during vibration input.

Although described in detail in the first embodiment of the invention, the invention is not in any way limited by the specific descriptions in the first embodiment, and can be worked in various was with the addition of various modifications, revisions, improvements, and the like based on knowledge common to those having ordinary skill in the art. It goes without saying that such embodiments are included within the scope of the invention.

For example, in the above embodiments, shock-absorbing lip protrusions 64, 66, 68, 72, 74, 144, 146, 148, 150, and 152 were integrally formed on both surfaces of the movable rubber plate 50 or 126, but these shock-absorbing lip protrusions are by no means necessary. Several loose independent shock-absorbing lip protrusions can also be used in addition to the upright shock-absorbing lip protrusions continuously extending in the peripheral or axis-perpendicular direction.

In addition, the outer peripheral annular plate portion 62 does not need to have a corrugated shape continuously undulating around the entire circumference in the circumferential direction. It may, for example, also have a corrugated shape that is divided in some or many places on the periphery.

When corrugated parts are formed on the outer peripheral edge of the movable rubber plate 50, no thin connector 69 is required between them.

Figure 18:
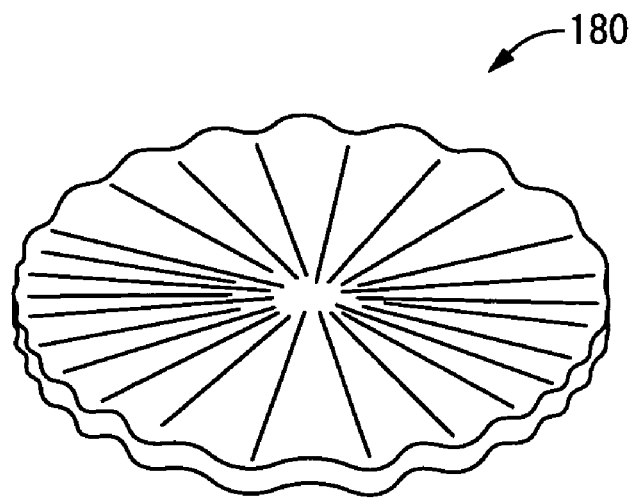
FIG. 18 is a perspective view of a movable rubber plate of another construction that is usable in the present invention.
Figure 19:
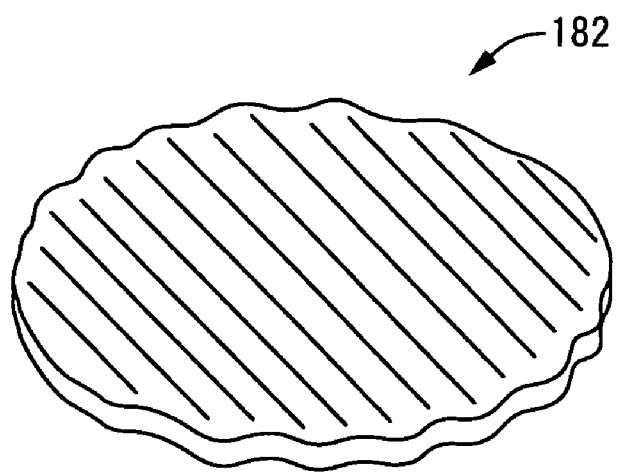
FIG. 19 is a perspective view of a movable rubber plate of another construction that is usable in the present invention.

The corrugated part in the movable rubber plate does not need to be formed on the outer peripheral edge. Specifically, as illustrated in FIGS. 18 and 19, substantially all of movable rubber plates 180 and 182 can be formed as corrugated parts. In short, the entire movable rubber plate 180 and 182 illustrated in FIGS. 18 and 19 are formed with a generally constant thickness, but continuously expanding curved undulations can be provided by means of corrugation so as to undulate over the entirety in a single radial direction or circumferential direction.

The specific shape of the main rubber elastic body or the specific structure or shape of the orifice passage can be suitably modified in consideration of the planned space or damping properties required of the mount, and are not limited to those in the embodiments.

In the above embodiments, specific examples of the invention applied to an automobile engine mount 10 or 100 were illustrated, but the invention can be used for any of various types of damping mounts for vibrating elements other than automobile body mounts and differential mounts.

What is claimed is:

1. A fluid filled vibration damping device comprising:
    a first mounting member;
    a second mounting member;
    a main rubber elastic body elastically connecting the first and second mounting members;
    a pressure receiving chamber whose wall is partially formed by the rubber elastic body to accommodate pressure fluctuations during vibration input;
    an equilibrium chamber whose wall is partially formed by a flexible film to accommodate changes in volume; the pressure receiving chamber and the equilibrium chamber being disposed on either side of a partition member supported by the second mounting member, and having a non-compressible fluid sealed therein;
    an orifice passage through which the pressure receiving chamber and equilibrium chamber communicate with each other;
    a movable panel housed in a housing space that is provided in the partition member and held in communication with the pressure receiving chamber and the equilibrium chamber via through holes formed through the partition member so that a pressure of the pressure receiving chamber is exerted onto one side of the movable panel and a pressure in the equilibrium chamber is exerted onto another side of the movable panel, wherein
    minute pressure fluctuations in the pressure receiving chamber during vibration input can be escaped into and absorbed by the equilibrium chamber by means of the movable panel, the movable panel is composed of a movable rubber plate formed by a rubber elastic body, and includes at least partially a corrugated part which expands in generally a form of a corrugated panel by means of continuous depressions and protrusions, the movable rubber plate has at a central portion thereof a circular flat plate portion, and at a peripheral portion thereof an annular plate portion that constitutes the corrugated part and is formed in a curved and undulating shape so as to be corrugated in a thicknesswise direction in a circumferential direction along an entire circumference thereof, wherein a center portion in the thicknesswise direction of the annular plate portion oscillates vertically in the circumferential direction.

2. A fluid filled vibration damping device according to claim 1, wherein a height of undulations in a thicknesswise direction of the movable rubber plate between the protrusions on one side and the protrusions on another side of the corrugated part of the movable rubber plate is greater than a distance between vertically opposite inner surfaces in the housing space, and the movable rubber plate thickness at each location of the corrugated part is less than the distance between the vertically opposite inner surfaces in the housing space, so that all the protrusions on both sides of the corrugated part are in contact with the inner surfaces of the housing space, and all the depressions on both sides of the corrugated part are apart from the inner surfaces of the housing space, forming a gap therebetween.

3. A fluid filled vibration damping device according to claim 1, wherein a positioning member is disposed for positioning the movable rubber plate relative to the partition member to locate the movable rubber plate in generally a center inside the housing space in a direction perpendicular to a thicknesswise direction.

4. A fluid filled vibration damping device according to claim 3, wherein the positioning member comprises a positioning engagement portion formed generally on center on at least one side of the movable rubber plate in order to position the movable rubber plate relative to the partition member.

5. A fluid filled vibration damping device according to claim 1, wherein the corrugated part has a shock-absorbing lip protrusion integrally formed at a surface in contact with at least one of vertically opposite inner surfaces of the housing space.

6. A fluid filled vibration damping device according to claim 1, wherein the flat plate portion and corrugated part both have integrally formed shock-absorbing lip protrusions on both sides in a thicknesswise direction of the movable rubber plate, which are in contact in a pre-compressed state with inner surfaces of the housing space.

7. A fluid filled vibration damping device according to claim 1, wherein the movable rubber plate has the corrugated part along substantially an entirety thereof.

8. A fluid filled vibration damping device according to claim 1 wherein the movable rubber plate is micro-displaceably disposed in the housing space in a thicknesswise direction of the movable rubber plate with a given amount of gap all a way around, and the corrugated part, on at least one side of the movable rubber plate, initially strikes an inner surface of the housing space when the movable rubber plate is displaced and strikes the inner surface of the housing space at the partition member.

9. A fluid-filled vibration damping device according to claim 1, wherein a height of undulations in a thicknesswise direction of the movable rubber plate between the protrusions on one side and the protrusions on the other side of the corrugated part of the movable rubber plate is less than a distance between vertically opposite inner surfaces in the housing space, so that the corrugated part of the movable rubber plate is displaceably housed, with a given amount of gap in the thicknesswise direction of the movable rubber plate, and the corrugated part is displaced in the thicknesswise direction of the movable rubber plate into contact with the inner surface of the space.

10. A fluid filled vibration damping device according to claim 1, wherein the second mounting member is generally cylindrical, the first mounting member is disposed apart from the second mounting member, an opening at one end of the second mounting member is fluid-tightly sealed by the main rubber elastic body that elastically connects the first and second mounting members, an opening at the other end of the second mounting member is fluid-tightly sealed by the flexible film, the partition member fixedly supports the second mounting member, being disposed so as to expand perpendicularly to an axis of the second mounting member between facing surfaces of the main rubber elastic body and flexible film, so that the pressure receiving chamber and equilibrium chamber are formed on either side of the partition member, the housing space is formed so as to expand perpendicularly to the axis of the second mounting member inside the partition member, and the movable rubber plate is housed in the housing space so as to expand perpendicularly to the axis of the second mounting member.

11. A fluid filled vibration damping device according to claim 1, wherein the circular flat plate portion is a disk-shaped center flat panel portion; the annular plate portion is a disk-shaped outer peripheral annular portion; and an annular thin connector is interposed between and elastically connects the center flat panel portion and the outer peripheral annular portion.

12. A fluid filled vibration damping device according to claim 1, wherein the peripheral portion is altered with substantially no change in a radial cross section shape and size.

* * * * *